Nov. 26, 1957 F. O. WORDEN 2,814,272
CATTLE OILER
Filed May 5, 1955 2 Sheets-Sheet 1
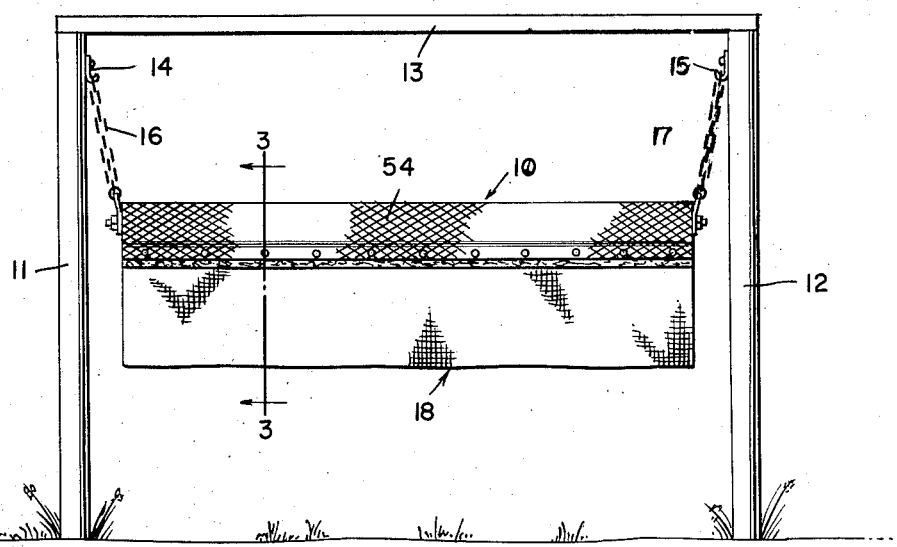
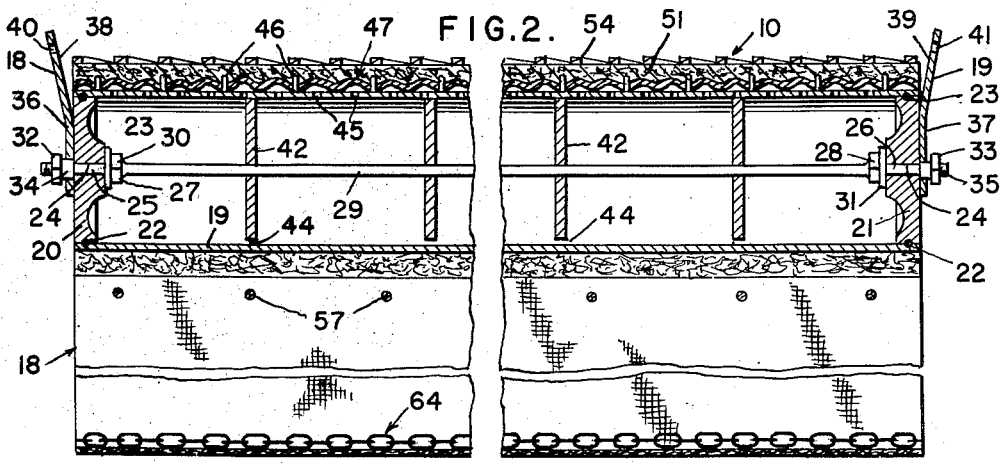
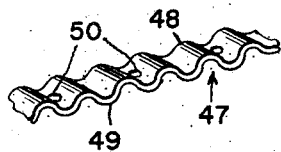
Inventor
Floyd O. Worden
By Shoemaker & Mattare
ATTYS Inventor
Floyd O. Worden
By Shoemaker & Mattare
ATTYS

United States Patent Office 2,814,272
Patented Nov. 26, 1957

2,814,272

CATTLE OILER

Floyd O. Worden, Alliance, Nebr., assignor to Worden Company, Grand Island, Nebr., a corporation Application May 5, 1955, Serial No. 506,156

14 Claims. (Cl. 119—157)

This invention relates to devices for applying chemicals to the skin of live stock for the purpose of destroying grubs, insects and the like and pertains more particularly to improvements in such devices to render them more effective for the purpose intended.

Damage to stock growers which results from ineffectual control of grubs and the like yearly constitutes an impressive amount. The most effective manner in combatting insects such as flies, lice or the like, is to subject the live stock to an application of chemical, in this case a liquid chemical, at such time as to destroy the grub or larva before the insects have reached the adult stage.

It is, therefore, a primary object of this invention to provide an improved live stock oiler particularly effective in applying liquid chemical to the hide or skin of live stock and to do so in the field at points located actually on the feeding grounds, permitting the live stock herd to have free access to the oiler.

Another object of this invention is to provide an improved form of live stock oiler which is extremely effective and yet which is economical in manufacture.

A further object of this invention is to provide an improved livestock oiler embodying an elongate container adapted to receive a supply of liquid chemical and which has located longitudinally therealong and along a region thereof which is normally disposed uppermost, a plurality of openings to permit the liquid chemical to escape therefrom when the container is partially rotated as a result of an animal walking therebeneath, and in which there are improved means for distributing the liquid chemical from the access openings to absorbent means which depends from the container and against which the live stock will rub as they pass under the container.

Still another object of this invention is to provide an improved cattle oiler embodying an elongate cylindrical container for liquid chemical which has a plurality of openings therein in an uppermost region thereof and which has wrapped therearound a sheet of absorbent material whose opposite longitudinal edges depend from the container and sandwich therebetween absorbent means with the absorbent means depending from the absorbent sheet and the container to contact live stock passing beneath the container mechanism.

A still further object of this invention is to provide an improved cattle oiler embodying an elongate cylindrical container for liquid chemical which has its opposite ends closed by a pair of disc-like members provided with O-rings circumferentially thereof and in contact with the inner surface of the container and wherein there is provided mounting means extending between the closure discs and therebeyond so that the cylindrical container may be rotatably suspended from a support and wherein baffle plates are secured in proper position within the container upon the mounting means.

A further object of this invention is to provide an improved cattle oiler embodying an elongate cylindrical body closed at both ends and provided in longitudinally spaced relation therealong with a row of pegs or studs in upstanding relation so as to locate and receive a strip of corrugated material in covering relation to the openings to maintain the same open and prevent their clogging.

A further object of this invention is to provide an improved cattle oiler which includes an elongate cylindrical container for liquid chemical which has wrapped therearound an absorbent sheet and which has depending therefrom absorbent means in the form of layers of absorbent material such as cloth and the like, which has disposed therein flexible weight means to maintain the absorbent means in proper depending relation so as to closely conform to and engage upon the back of an animal passing therebeneath.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be restored to without departing from the spirit or sacrificing any of the advantages of the invention.

In the drawings:

Fig. 1 is an elevational view showing one form of the invention in its normal position to be utilized at a feeding ground;

Fig. 2 is an enlarged vertical section taken through the oiler assembly shown in Fig. 1;

Fig. 3 is an enlarged transverse sectional view taken substantially along the plane of section line 3—3 of Fig. 1;

Fig. 4 is an enlarged partial perspective view showing details of the corrugated strip for covering and protecting the access openings in the oiler;

Figure 5:
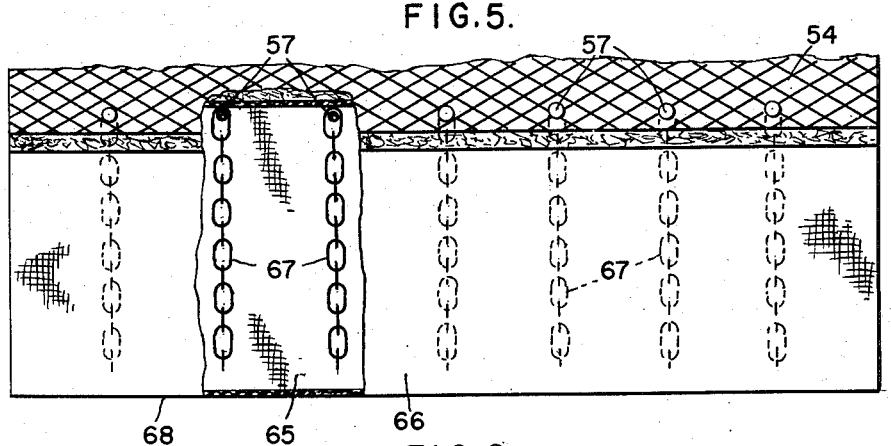
Fig. 5 is an elevational view partly broken away showing the lower portion of a modified form of oiler.

Reference is now had more particularly to Fig. 1, in which the reference numeral 10 indicates the oiler assembly generally, which is suspended at a fixed elevation above the ground from a supporting framework assembly which includes uprights 11 and 12 and the cross bar 13 which interconnects the upper ends of the uprights. Of course, the supporting framework may take any desired form and the specific structure shown in Fig. 1 is intended to be illustrative only.

The supporting uprights 11 and 12 are provided with hook members 14 and 15 upon which are engaged chain members 16 and 17 which are in turn provided at their lower ends with the mounting bracket members 18 and 19 more fully described hereinafter. Suffice it at this point to say that the chains 16 and 17 or like flexible elements rotatably support the oiler assembly 10 in suspended relation from the uprights 11 and 12 and in properly spaced relation above the ground so that when live stock such as cattle pass therebeneath the outer surface of the oiler will contact the back of the live stock with the absorbent means, which is indicated generally by the reference character 18, draped upon and engaging their skin or hide and such that the movement of the live stock will cause a partial rotation of the oiler assembly 10 to effect an automatic dispensation of liquid chemical therefrom which in turn will constantly maintain the absorbent means 18 in moist condition so that some liquid chemical will be applied to the hides of the live stock as they pass therebeneath and in contact with the absorbent means 18.

Referring now more particularly to Figs. 2 and 3, it will be seen that the oiler assembly 10 consists essentially of an elongate cylindrical or tubular body 19 which is closed at its opposite ends by the disc members 20 and 21 each of which is provided with an annular groove 22 within which is fitted an O-ring 23 of rubber or similar material. The circumference of the discs 20 and 21 is such that the discs are snugly fitted within the ends of the cylindrical body 10 and such that the O-rings 23 are deformed by engagement with the inner surface of the body 19 and thereby effect a sealing engagement therewith to prevent loss of liquid.

Each disc 20 and 21 is provided with a central bore 24 and the shanks of the bolts 25 and 26 are passed therethrough with the heads 27 and 28 of such bolts disposed on inner sides of the discs, these bolt heads being interconnected by the elongate rod 29 which extends therebetween and is connected thereto. Preferably, washers 30 and 31 are disposed between the bolt heads 27 and 28 and the adjacent inner surfaces of the discs 20 and 21. The bolts 25 and 26 are of such length as to extend outwardly of the disc members 20 and 21 and they have received thereon the nut members 32 and 33 which bear against bushing members 34 and 35, the bushings 34 and 35 being disposed between such nut members and the outer faces of the discs 20 and 21.

The mounting bracket members 18 and 19 for suspending the oiler from the chains 16 and 17 have substantially vertical lower end portions 36 and 37 which are apertured to loosely receive their respective bushing members 34 and 35 and it will be noted that the bushing members are slightly longer than the thickness of these lower end portions 36 and 37 to obviate binding and to permit the oiler assembly to be freely rotated. The upper end portions 38 and 39 of the mounting brackets are slightly angulated with respect to the lower portions to be directed away from the opposite ends of the oiler assembly 10 and these portions are apertured as at 40 and 41 to receive or be connected to the lower ends of the chain members 16 and 17.

The bolts 25 and 26 together with the elongate rod 29 form mounting means which extend beyond the opposite ends of the oiler to permit the oiler to be rotatably supported by the brackets 18 and 19 and this means also serves to interconnect the discs 20 and 21 and maintain them in proper relation to close the opposite ends of the cylindrical body 19. Additionally, this means is utilized to mount a plurality of baffle plate members 42 within the interior of the body 19 and in this respect it will be noted that each baffle plate is to be rigidly mounted on the elongate rod 29 in properly spaced relation within the interior of the body 19 to prevent surge of liquid chemical within the oiler as the same may be moved when in use.

As will be seen most clearly in Fig. 3, each baffle plate or disc 42 has the major circumferential extent thereof formed so as to closely conform with the inner surface of the body 19 to prevent flow of liquid, whereas a small portion of each baffle plate or disc is cut away as indicated by the reference character 43 to provide a small passageway 44 through which the liquid chemical may pass to seek its own level within the confines of the body 19. At the same time it will be appreciated that the passageways 44 are small enough to prevent undue surge or splashing of the liquid within the body.

The cut away portions 43 of the baffle plates 42 are disposed in substantially diametrically opposite relation to a plurality of discharge or access openings 45 which openings are disposed in longitudinally spaced relation along the body 19 to form a row of such openings in the manner which is indicated most clearly in Fig. 2.

Intermediate these openings 45 there is provided a plurality of upstanding stud members 46 and as is the case in Fig. 2, it will be seen that there is a stud positioned between every other adjacent pair of openings 45 although it will be appreciated that any desired spacing of studs may be utilized, for example, they may be spaced between each third adjacent pair of openings or they may be disposed between each adjacent pair of such openings. To prevent closing off or plugging of the access openings 45, a corrugated strip 47 is utilized, this strip being seen most clearly in Fig. 4. The strip is composed of alternate peaks 48 and valleys 49 with at least some of the valleys 49 being provided with openings 50 therethrough, such that the openings 50 receive the studs or pegs 46 and serve to locate and position the strip 47 along the body 19 in covering relation to the row of discharge openings 45.

In the strip shown in Fig. 4, it will be noted that every other valley 49 is provided with a peg-receiving opening 50 to correspond with the location of the pegs 46 as shown in Fig. 2, such that each discharge opening 45 will have a peak portion 48 of the strip 47 immediately thereabove to provide a maximum of discharge area for the liquid chemical to escape from the body 19. Of course, the distance between adjacent peaks or valleys of the corrugated strip 47 must be such as to approximate this condition in order that the liquid chemical be most easily discharged from the interior of the body 19.

Wrapped around the exterior surface of the body 19 is a sheet of absorbent material 51 which may be felt or the like and which is of sufficient width that it has opposite longitudinal edge portions 52 and 53 which project from the body 19 in the manner shown most clearly in Fig. 3 and to maintain the sheet 51 in place there is provided a covering of expanded metal 54 which also has opposite longitudinal edge portions 55 and 56 which overlie at least in part the edge portions 52 and 53 of the sheet 51 so as to receive therethrough a plurality of fastening elements such as the bolts 57 and associated nuts 58 to pinch the edge portions 55 and 56 of the expanded metal against the edge portions 52 and 53 of the sheet and maintain the absorbent sheet in close contact with the outer surface of the body 19. The fasteners 57 also serve to sandwich the absorbent means 18 between the edge portions 52 and 53 of the absorbent sheet 51 such that the absorbent means is in close physical contact with the absorbent sheet whereby to effectively transfer the liquid chemical therebetween.

It is to be appreciated that the nuts 58 on the bolts 57 are not to be drawn so tight as to pinch the absorbent sheet 51 and the absorbent means 18 so tightly that they will be ineffective to contain a great deal of liquid chemical and for this reason the showing of Fig. 3 is slightly exaggerated to illustrate that the bolts 57 only loosely engage the parts together but at the same time it is to be pointed out that it is desirable to maintain a good physical contact between the edge portions 52 and 53 and the absorbent means 18.

In the form of the invention shown in Figs. 1-3, the absorbent means 18 takes the form of an elongate sheet of material such as burlap, untreated canvas or the like, which will readily absorb the liquid chemical. The sheet is folded such that it forms two layers 59 and 60 with the free longitudinal edges 61 and 62 disposed between the edge portions of the absorbent sheet 51 and with the lower portion looped as at 63 to hang freely from the body 19. A flexible weight means indicated generally by the reference character 64 and which preferably takes the form of a length of chain is located within the pocket formed by the loop 63 and any suitable means may be provided for retaining this length of chain within the loop pocket. The purpose of the flexible weight means is to cause the absorbent means 18 to closely conform to the contour of the animal's body.

It will be appreciated that the oiler assembly 10 is disposed at an elevation above the ground whereby an animal passing therebeneath will engage its back against the expanded metal 54 covering the oiler body. The expanded metal 54 has a rough surface which will effect a scratching action on the animal's back and will also cause the body 19 to rotate partially so that the normally uppermost access or discharge openings 45 will be rotated to permit the chemical within the body to flow therethrough and maintain the sheet 51 constantly saturated. Due to the good physical contact between the free edge portions 61 and 62 of the absorbent means 18 and the sheet 51, the absorbent means will likewise be constantly maintained in a substantially saturated condition so as to effectively apply a dose of the liquid chemical to an animal's hide.

Reference now is more particularly had to Fig. 5 in which a modified form of absorbent means will be seen which embodies a double layered sheet of canvas or burlap similar to the sheet illustrated in Fig. 3, such layers being indicated by the reference characters 65 and 66. However, in this case the flexible weight means consists of a plurality of chain members 67 which are suspended vertically between the layers 65 and 66 by virtue of the engagement of the uppermost links thereof with the fastening members 57. It is preferred that the chain members 67 extend vertically between the layers 65 and 66 to terminate substantially at or adjacent to the lowermost edge 68 of the double layered absorbent sheet.

Figure 6:
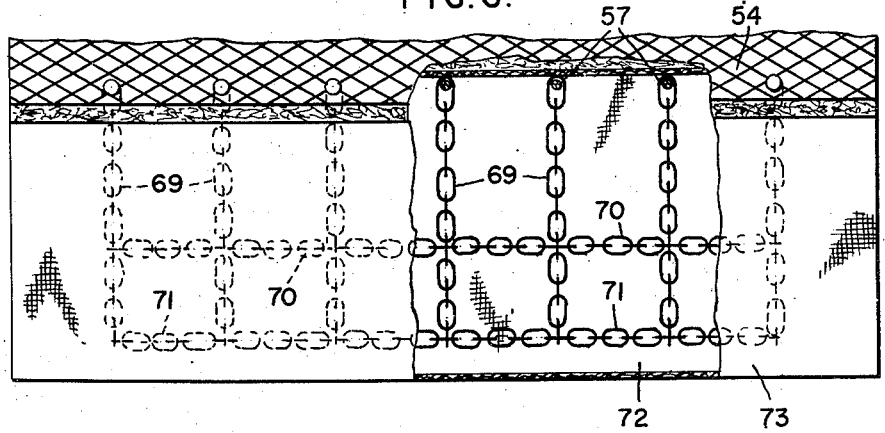
Fig. 6 is a view similar to Fig. 5, but showing a further modified oiler assembly.

Another form which the absorbent means may take is that illustrated in Fig. 6 wherein there are a plurality of chain members 69 suspended in the same fashion as is illustrated in Fig. 5 but which are interconnected by a series of cross chain members 70 and 71 to provide a network of chain which is disposed between the two layers 72 and 73 of the absorbent means.

Figure 7:
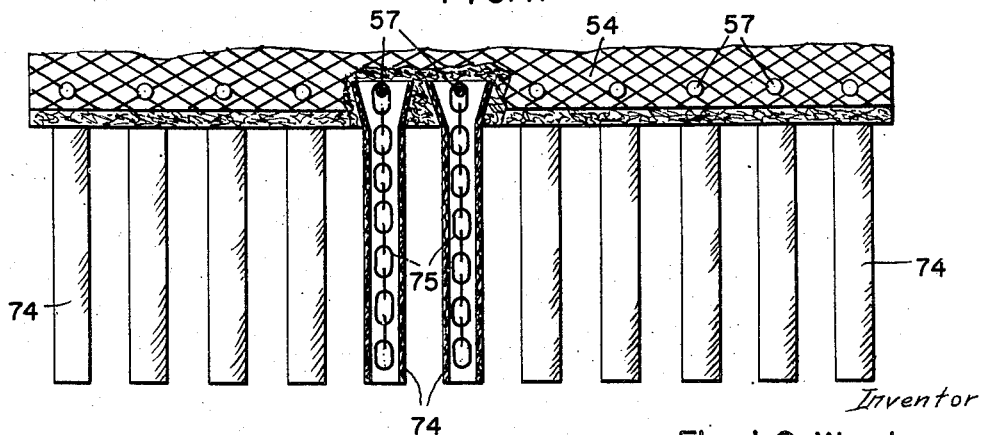
Fig. 7 is a view similar to Figs. 5 and 6 but showing a still further modified oiler assembly.

Fig. 7 illustrates a still further modified form of absorbent means which in this case takes the form of a series of absorbent tubes 74 which have disposed therewithin the flexible weight members in the form of chains 75 which have their uppermost links engaged by the fastening members 57.

In any event, the absorbent means is to be so formed as to closely conform to the contour of the animal's back with which it engages and thereby apply a goodly portion of the liquid chemical to the animal's hide or skin to most effectively destroy grubs and insects.

I claim:

1. In a cattle oiler comprising a tubular body member having closure means at its opposite ends, said body member having a row of longitudinally spaced and aligned openings therein, a plurality of upstanding pins secured to the body member and disposed between adjacent openings, a corrugated strip extending along the body member over the openings, at least some of the valley portions of the corrugated strip being apertured to receive said pins with peaks thereof protectively overlying said openings, a layer of absorbent material disposed about and covering said body member and said strip to maintain the latter engaged upon said pins, a sheet of absorbent material contacting said layer of absorbent material and edge-connected longitudinally of and depending from said body member along a line substantially diametrically opposed to said row of openings, and means connected to said body member for rotatably suspending said body member in a substantially horizontal position with said row of openings normally disposed uppermost.

2. In a cattle oiler as defined in claim 1 wherein said sheet of absorbent material is of double thickness and looped to define a free longitudinal edge, there being a flexible weight member disposed between the layers along said free edge.

3. In a cattle oiler as defined in claim 1, wherein said sheet of absorbent material is of double thickness, there being a network of flexible weight members disposed between the layers of the sheet.

4. In a cattle oiler comprising a tubular body member having closure means at its opposite ends, said body member having a row of longitudinally spaced and aligned openings therein, a plurality of upstanding pins secured to the body member and disposed between adjacent openings, a corrugated strip extending along the body member over the openings, at least some of the valley portions of the corrugated strip being apertured to receive said pins, a layer of absorbent material disposed about and covering said body member with said strip being sandwiched between said material and said body member, absorbent means connected to said body member in engagement with said absorbent layer and depending from said body along a line substantially diametrically opposed to said row of openings, and means for rotatably suspending said body member in a substantially horizontal position with said absorbent means disposed lowermost.

5. In a cattle oiler according to claim 4 wherein said absorbent means is a sheet of absorbent material of double thickness, the sheet being looped to define a free edge, and there being a flexible weight member disposed between the layers along said free edge.

6. In a cattle oiler according to claim 4 wherein said absorbent means is a sheet of absorbent material of double thickness, the sheet being looped to define a free edge, and there being a network of flexible weight members disposed between the layers of the sheet.

7. In a cattle oiler according to claim 4, wherein said absorbent means is a plurality of tubes of absorbent material connected adjacent one end to the body, there being a flexible weight member disposed within each such tube.

8. In a cattle oiler according to claim 4, wherein said means for rotatably suspending said body member includes rod means extending longitudinally and centrally through the body member and having opposite end portions projecting therefrom, and a hanger rotatably carried by each projecting end portion.

9. In a cattle oiler according to claim 8 including a plurality of spaced baffle plates secured to said rod means within the body member, each baffle plate having the major portion of its circumference engaged with the inner surface of the body member, there being a small circumferential portion of each baffle plate in the region of the body member substantially diametrically opposed to said row of openings which is spaced from the inner surface thereof.

10. A cattle oiler comprising an elongate cylindrical body having its opposite ends closed to effect a container adapted to receive a quantity of liquid chemical useful in destroying insect pests, said body being covered by a layer of absorbent material and said layer of material being held in place upon the body by a sheet of foraminous metallic material, the opposite edges of which are secured by fastening means, absorbent means depending from said body and secured between said opposite edges of the foraminous material in contact with said layer of absorbent material, said body having a row of spaced longitudinal openings therein along a line substantially diametrically opposed to said absorbent means, a plurality of upstanding pins intermediate said openings, a strip of corrugated material having openings in its valley portions receiving said pins with the strip disposed between the outer surface portion of said body adjacent said row of openings and said layer of absorbent material with peaks thereof protectively overlying said openings, and means connected to said body for rotatably suspending said body in a substantially horizontal position with said absorbent means disposed lowermost.

11. In a cattle oiler according to claim 10 wherein said absorbent means is a plurality of tubes of absorbent material connected adjacent one end to the body, there being a flexible weight member disposed within each such tube.

12. In a cattle oiler as defined in claim 10 wherein said absorbent means is of double thickness and looped to define a free longitudinal edge, there being a flexible weight member disposed between the layers along said free edge.

13. In a cattle oiler as defined in claim 9, wherein said absorbent means is of double thickness, there being a network of flexible weight members disposed between the layers of said absorbent means.

14. In a cattle oiler according to claim 10, wherein said sheet of foraminous material is expanded metal presenting a rough surface for engaging an animal's skin to rotate the body as the animal passes thereunder.

References Cited in the file of this patent

UNITED STATES PATENTS

| | | |
|---|---|---|
| 1,129,977 | Hagny | Mar. 2, 1915 |
| 1,471,109 | Dick | Oct. 16, 1923 |
| 1,817,449 | Vaughan | Aug. 4, 1931 |
| 1,837,571 | Morris | Dec. 22, 1931 |
| 2,702,020 | Worden | Feb. 15, 1955 |
| 2,711,722 | Gray | June 28, 1955 |